S. T. CONVERSE.
Underclothing.

No. 8,435. Reissued Sept. 24, 1878.

Witnesses
Chas. E. Sleeper.
Geo. O. G. Coale

Inventor
Susan Taylor Converse
by J. E. Maynadier
her atty.

UNITED STATES PATENT OFFICE.

SUSAN TAYLOR CONVERSE, OF WOBURN, MASSACHUSETTS.

IMPROVEMENT IN UNDER-CLOTHING.

Specification forming part of Letters Patent No. 166,190, dated August 3, 1875; Reissue No. 8,435, dated September 24, 1878; application filed July 13, 1878.

*To all whom it may concern:*

Figure 1:
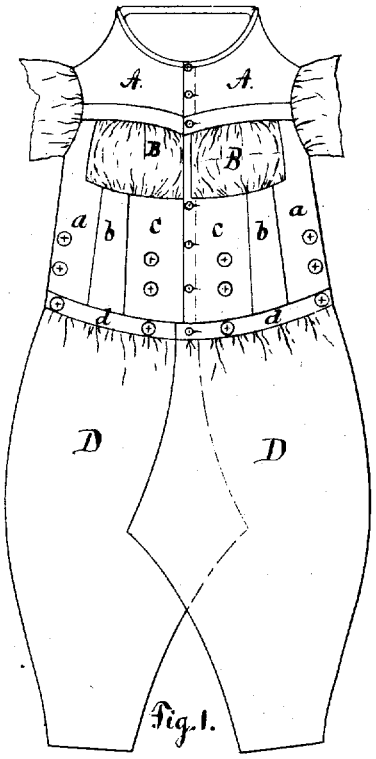
Figure 2:
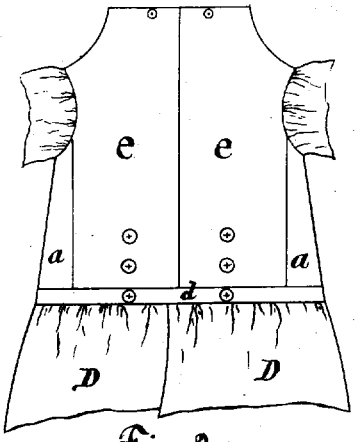

Be it known that I, SUSAN TAYLOR CONVERSE, of Woburn, Massachusetts, have invented certain Improvements in Under-Clothing for Women, of which the following is a specification:

In the drawings, Figure 1 is a front elevation, and Fig. 2 a partial rear elevation, of a garment embodying my invention.

The main feature of my invention consists in a garment formed of a body or waist, open in front, high or low necked, long or short sleeved, cut after a peculiar pattern new with me, by which a waist can be made to fit the figure, support the breasts in their proper positions, and be both comfortable and healthful to the wearer; also, in the combination, with this body or waist, of independent leg-pieces, so as to make a complete garment, such as is shown in Figs. 1 and 2 of the drawings, in which—

D D are the leg-pieces, and the remainder what I have termed a "body." I form the body of the garment of the neck-pieces A A, waist-pieces *a b c*, and back-pieces *e*, and insert in the opening thus left the breast-pieces B B. The piece *a* must be considerably wider at the bottom than at the top, and its upper part must be between the breast-pieces B and the arm size. These breast-pieces are gathered at top and bottom to give the necessary fullness in one direction, and are cut curved either at top or bottom, or both, to give the necessary fullness in the other direction, and the front end is cut shorter than the rear end to hold the breast-pieces in such position as to form a receptacle, thereby allowing the breast to lie undisturbed by other clothing and free from irritation by the movements of the body while in exercise.

I secure to the body of the garment two or more rows of buttons. Each button is sewed through several thicknesses of cloth, placed opposite the button upon the under side of the garments. This prevents the buttons being torn off in wear or washing. The upper row of buttons is at the waist-line, the others below the first, each row being at such a distance from the other as not to obstruct the buttoning on of other garments. By this arrangement the waistband of the under skirt is below the waistband of the skirt next above it, and so of all of the waistbands, each is below that of the skirt outside of it, instead of having the waistbands of all the under-clothing on the same level, and one overlapping the other, which overlapping makes an unhealthful thickness of material around the waist, and also taxes one part of the human body with the weight of nearly all the clothing.

The leg-pieces D D are each separate and distinct from the other, and are united only by the band *d*, and may be buttoned, sewed, or otherwise secured to the body or waist.

What I claim as my invention is—

1. The body composed of the waist-pieces *a b c*, breast-pieces B, and back-pieces *e e*, made high or low necked and long or short sleeved, the pieces *b* and *c* being below the breast-pieces B, and the pieces *a* partly below the breast-pieces B and partly between them and the arm-holes, as described.

2. The garment above described, consisting of the body A, the breast-pieces B B, and leg-pieces D D, constructed and arranged together as described.

SUSAN TAYLOR CONVERSE.

Witnesses:

J. E. MAYNADIER,

GEORGE O. G. COALE.